FRANK H. LEMON
INVENTOR
BY
BUCKHORN, BLORE, KLARQUIST & SPARKMAN
ATTORNEYS

FRANK H. LEMON
INVENTOR

BY
BUCKHORN, BLORE, KLARQUIST & SPARKMAN
ATTORNEYS

United States Patent Office 3,425,643
Patented Feb. 4, 1969

3,425,643
COMBINED SPINNING AND CASTING REEL
Frank H. Lemon, 6829 N. Pittsburgh,
Portland, Oreg. 97203
Filed Nov. 21, 1966, Ser. No. 595,805
U.S. Cl. 242—84.2                              7 Claims
Int. Cl. A01k 89/00, 89/04

ABSTRACT OF THE DISCLOSURE

A fishing reel has a grip which is grasped by the fingers of the rod holding hand and swings a reel from a winding position transverse to the rod to a casting position extending along the rod, and a level wind mechanism is swung away from the reel as the latter is moved to its casting position. The level wind mechanism is driven by a variable speed drive so that it can be driven fast when the reel is used for spin casting and can be driven slowly when the reel is used for bait casting.

---

This invention relates to a combined spinning and casting reel, and more particularly to an improved fishing reel which includes a spool which may be turned from a position extending across a fishing rod to a position extending along the rod.

An object of the invention is to provide a new and improved combined spinning and casting reel.

Another object of the invention is to provide an improved fishing reel which includes a spool which may be turned from a position extending across a fishing rod to a position extending along the rod.

A further object of the invention is to provide a level wind mechanism which can be varied in pitch.

Another object of the invention is to provide a fishing reel having a hand grip which may be pressed to change the condition of the reel preparatory to casting.

A still further object of the invention is to provide a fishing reel in which a spool is rotated during reeling in and is stationary during casting together with a level wind mechanism which is operative while reeling in and is not operated during casting.

The invention provides a combined spinning and casting reel which includes a spool which, for spin casting, is moved by a grip actuated device from a reeling position extending across a fishing rod and adjacent a level wind guide of a level wind mechanism to a casting position in which the spool extends along the rod and is remote from the level wind guide. After a spin cast has been made, the user releases the grip device and a spring returns the reel to its reeling position. Preferably the level wind mechanism includes a selectively operable high speed drive for providing a long pitch to the line on the spool for spin casting and a selectively operable low speed drive for providing a short pitch to the line on the spool for casting with the spool rotating. A quickly operable shifter is provided for changing between the high speed drive and the low speed drive.

A complete understanding of the invention may be obtained from the following detailed description of a combined spinning and casting rod forming a specific embodiment thereof, when read in conjunction with the appended drawings, in which:

FIG. 6 is a bottom plan view taken along line 6—6 of FIG. 1.

Figure 1:
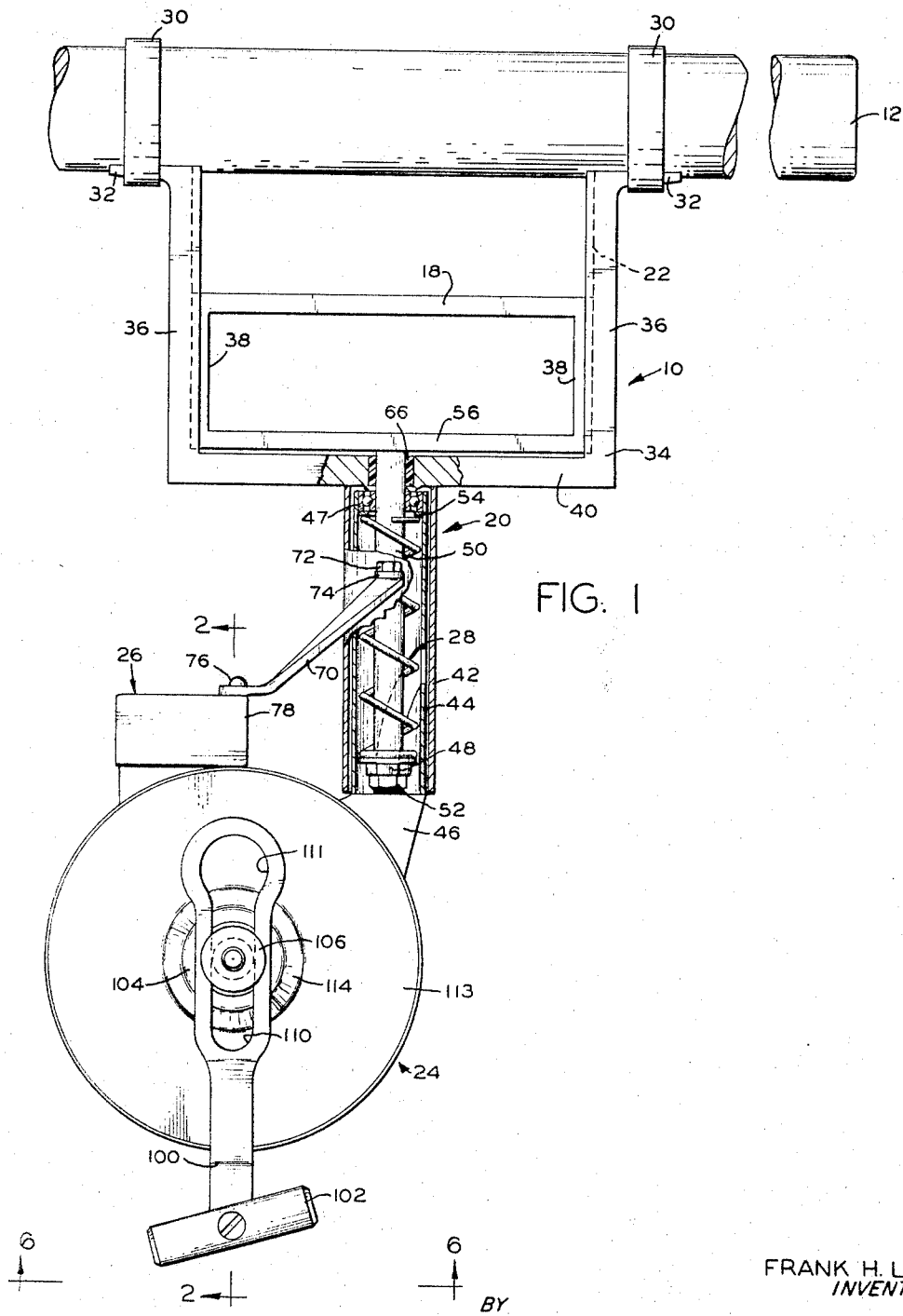
FIG. 1 is a fragmentary, side elevation view in partial section of a reel forming one embodiment of the invention and mounted on a fishing rod.

Referring now in detail to the drawings, a reel 10 is shown in FIG. 1 mounted on a fishing rod 12. The reel may be as a conventional bait casting reel with a spool 14 (FIG. 2) extending across or transversely of the rod, and the reel also may be used for spin casting in which the spool extends along the rod during casting and is turned back to a position extending across the rod after each cast has been made and is rotated to retrieve the line. To make a spin cast, the user grips the rod 12 (FIG. 1) and a looped handle 18 of an actuating device 20 of the reel and pulls the handle 18 up along a guideway 22 to cause the device 20 to turn 90° a main frame or housing 24 carrying the spool to swing the housing and the spool from the positions thereof shown in full lines in FIG. 6 to the positions thereof shown in broken lines in FIG. 6, This swings the spool away from guide wires or rods 25 of a level wind mechanism 26 to permit the line to be spin cast from the spool without interference from the level wind mechanism, The line then is manually released from the level wind mechanism and is spin cast, and then the user relaxes his grip on the handle 18, and a spring 28 returns the housing 24 to its reeling position which brings the spool 14 back into operative position relative to the level wind mechanism. The level wind mechanism 26 may be selectively operated at a high traversing speed to provide a long pitch or open distribution of the line on the spool 14 or a low traversing speed to provide a short pitch or close distribution of the line on the spool.

Figure 4:
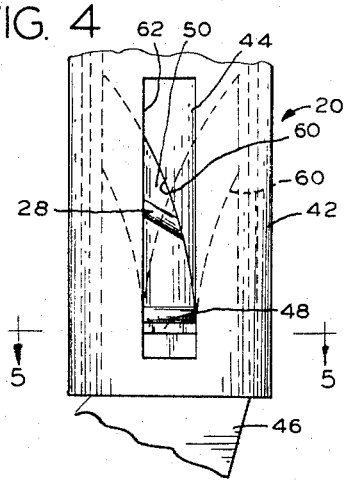
FIG. 4 is an enlarged fragmentary side elevation view of a portion of the reel of FIG. 1.
Figure 5:
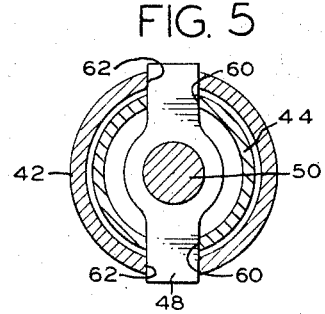
FIG. 5 is an enlarged horizontal sectional view taken along line 5—5 of FIG. 4.

The reel 10 is mounted on the rod 12 by conventional clamps 30 which engage feet 32 of a U-shaped mounting frame 34, which has the guideway 22 in parallel arms 36 thereof. The handle 18 has elongated parallel side portions 38 which are slidable in the guideway 22. A base 40 of the frame 34 has rigidly fixed thereto a tube 42 (FIGS. 1, 4 and 5). A cam sleeve 44 is mounted rotatably in the tube 42 and is integral with a connecting portion 46 of the main frame 24. The sleeve 44 supports the frame 24, and is supported by a radial-and-thrust bearing 47. The compression spring 28 bears against a key or cross pin 48 retained on a rod 50 by a nut 52 and against a washer 54 bearing against the thrust bearing 47 to keep the thrust bearing and sleeve 44 at the upper end of the tube 42. The rod 50 is integral with a lower portion 56 of the handle 18.

The end portions of the cross pin 48 extend through elongated, spiral or helical camming slots 60 (FIGS. 4 and 5) in the sleeve 44, and also extend through elongated splining slots 62 in the tube 42. When the handle 18 is moved upwardly in the guideway 22, the rod 50 pulls the key 48 up along the slots 60 and 62, and, since the slots 62 are parallel to the axis of the fixed tube 42 and the slots 60 are helical and are in the rotatable sleeve 44, the sleeve 44 is turned 90° to turn the main frame 24 and the spool from their reeling positions to their spin cast positions. When the user's grip on the handle is relaxed, the spring 28 returns the key 48 to its lowermost position and turns the sleeve 44 back to its starting position, which, of course, returns the main frame and the spool to their reeling positions. A nylon bushing 66 slidably supports the rod 50.

Figure 2:
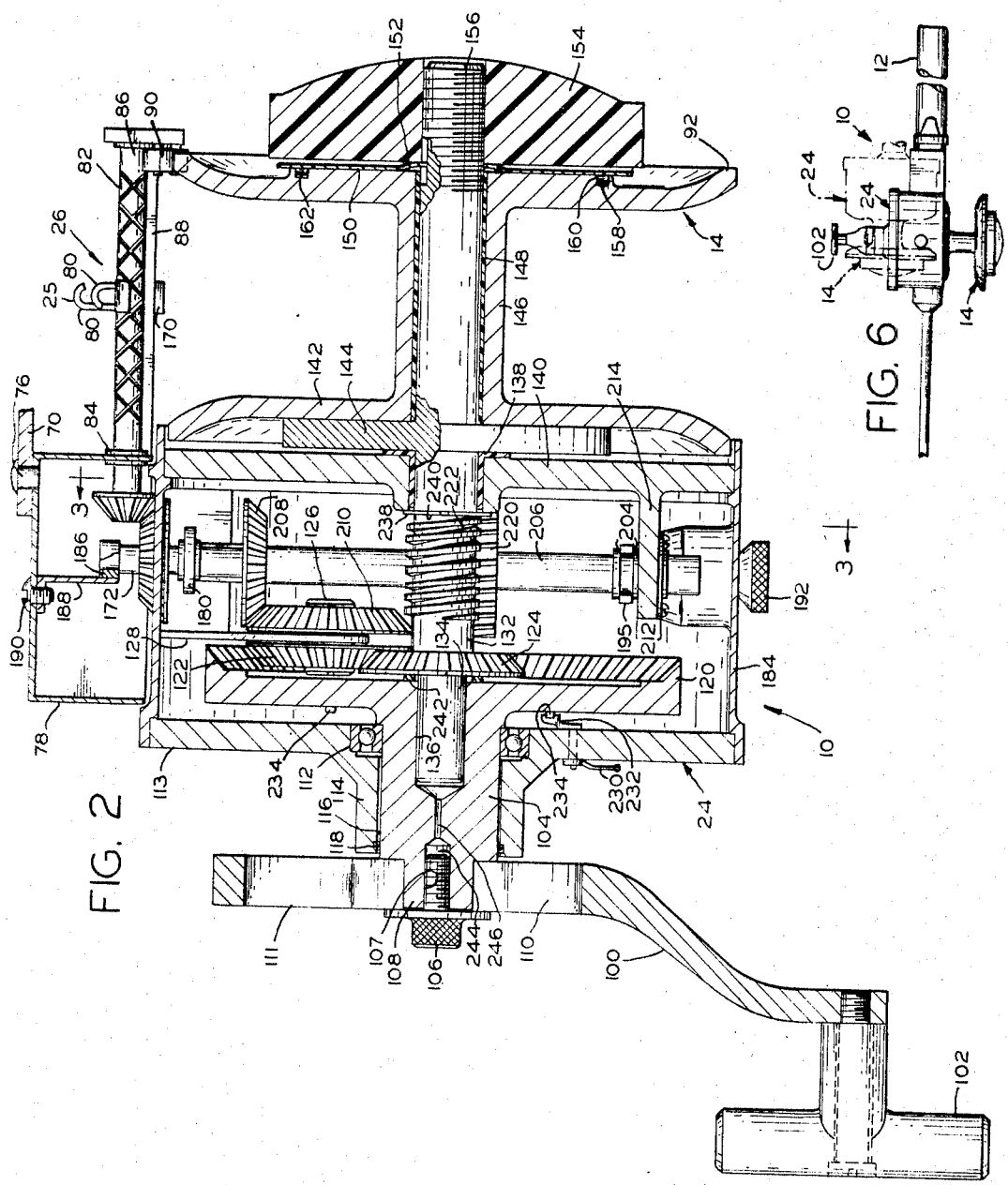
FIG. 2 is an enlarged vertical sectional view taken along line 2—2 of FIG. 1.

To cause the level wind mechanism 26 to be in a position out of the path of the line during spin casting, a link 70 (FIGS. 1 and 2), is secured at one end by a bolt 72 pivotally to a bracket 74 fixed to the tube and is secured at its other end pivotally by a rivet 76 to a housing 78 of the level wind mechanism. When the main frame 24 and the spool 14 are moved from their reeling in positions extending transversely to the pole 12 to their spin cast positions extending parallel to the pole, the link 70 and the main frame 24 hold the level wind mechanism in a clearance position to the rear of the spool and extending transversely to the pole, in which position the level wind mechanism is completely out of the path of the line when it is spin cast. The line is easily disengaged manually from the stiff guide wires 25 which are slightly different in length to offset hook-shaped ends 80 thereof to facilitate manual insertion and removal of the line into and from a position entrapped by the guide wires. The level wind mechanism is driven by a distributor shaft 82 journaled in bearings 84 and 86 carried by the housing 78 and an L-shaped arm 8 carried rigidly by the housing 78. A shoe 90 carried by the arm 88 is substantially tangential to a flared flange 92 of the spool 14 when the spool is in its reeling-in position as illustrated in FIG. 2.

The spool 14 (FIG. 2) is rotated and the level wind mechanism 26 is driven by a crank 100 having a handle 102 and secured rigidly and adjustably to a main drive shaft 104 by a screw 106 screwed into a tapped bore 107 in a boss portion 108 of the shaft 104, the boss portion projecting through a longitudinal slot 110 in the crank 100 to permit adjustment of the crank when the screw is loosened. An enlarged portion 111 of the slot 110 is adapted to pass over the head of the screw 106. The shaft 104 is journaled by a radial-and-thrust bearing 112 in a counterbore in a wall 113 of the housing 24 concentric to a tubular boss 114 of the housing 24, a grease seal 116 being positioned in a groove 118 and engaging the shaft. The shaft 104 has integral therewith a ring gear 120 (FIGS. 2 and 3), which drives bevel gears 122 and 124. The bevel gear 122 is keyed to a stub shaft 126 journaled on a plate 128 integral with a cylindrical portion 130 of the frame 24. The bevel gear 124 is keyed to a shaft 132 having one end portion 134 journaled in an axial bore 136 in the shaft 104. The shaft 132 also is journaled in a flanged bushing 138, preferably of nylon, in an end wall 140 of the housing 24, and aligned with the bore 136. A flange 124 of the spool 14 abuts a disc portion 144 of the shaft, and a drum portion 146 of the spool is journaled on a low friction bushing 148 preferably of nylon. The flange 92 of the spool frictionally engages a clutch or brake plate 150 splined to the shaft 132 by a belled, split, spring, central portion 152 of the plate 150. A nut 154 is screwed adjustably on a threaded end portion 156 of the shaft 132. The plate 150 has ratchet-like clicking teeth 158 projecting into a groove 160 in the flange 92, which are clicked by a projection 162 in the groove 160 when the spool slips on the shaft 132 to indicate slipping to the user.

Figure 3:
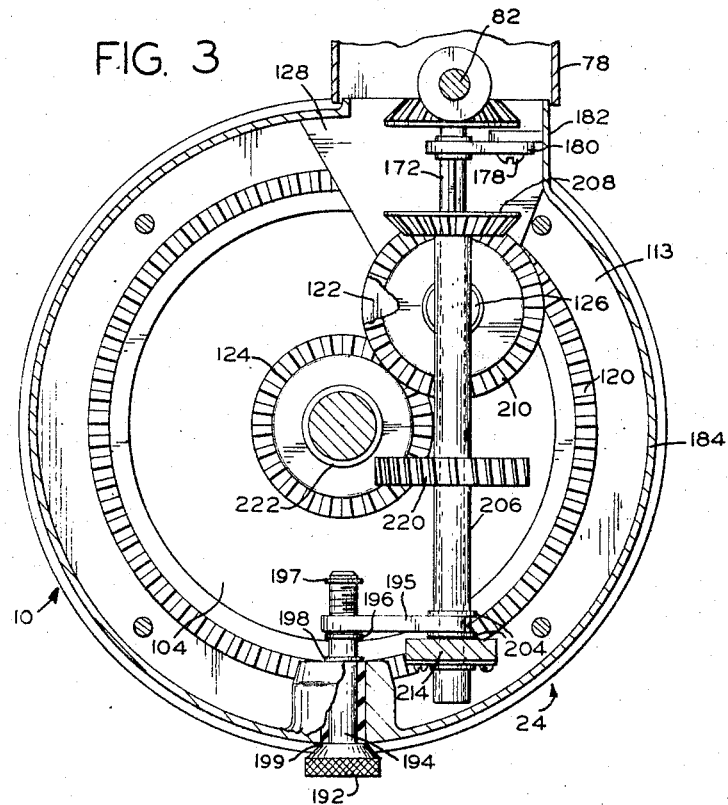
FIG. 3 is an enlarged vertical sectional view taken along line 3—3 of FIG. 2.

The reel 10 can be selectively used to spin cast and to bait cast. For spin casting, the level wind mechanism 24 is set to traverse, during reeling in, a carrier 170 carrying the guide wires 25 at a fast or high rate of speed relative to the rotation of the spool 14 to form an open or long pitch wind of the line on the spool. When the reel is to be used for bait casting in which the spool is rotated during the casting of the line, the drive of the level wind mechanism is set by the user to effect a close or short pitch wind of the line on the spool by traversing the carrier 170 at a low rate of speed relative to the rotation of the spool. The variable or two-speed drive of the level wind mechanism includes a short shaft 172 journaled in a bearing 174 carried by a mounting plate 176 secured rigidly by a screw 178 to a bracket 180 fixed to a tubular boss portion 182 of a cylindrical portion 184 of the housing 24. The housing 78 is journaled on the boss portion 182. The shaft 172 also is journaled in a radial-and-thrust bearing 186 (FIG. 2) carried by a bracket 188 secured rigidly by a screw 190 to the housing 78. To set the drive of the level wind mechanism for high speed traverse, a knob 192 is rotated to turn an actuator rod or screw 194 (FIG. 3) to move a fork 195 threaded thereon downwardly from an upper, low speed position thereof to a lower, high speed position which is shown in FIG. 3, in which latter position the fork 195 engages a stop 196 on the screw. The fork is movable between the stop 196 and a stop 197, and the screw 194 is held against thrust by a split ring 198 and a head 199. The fork 195 fits between collars 204 rigidly carried on a spline tube 206 and pulls the spline tube downwardly to move a bevel gear 208, which is keyed to and fixed on the spline tube, into mesh with a bevel gear 210 keyed to the shaft 126. The gear 210 drives the spline sleeve 206 through the gear 208. The sleeve 206 is slidable in a guide 212 carried by a bracket 214 (FIG. 2) on the wall 140 of the housing 24 and is splined to and slidable on the short shaft 172, the shaft 172 and the sleeve 206 overlapping or telescoping over substantial lengths of each other. Tie rods 216 tie the walls 113 and 140 detachably together.

For the low traversing speed drive of the level wind mechanism 26, the user turns the rod 194 to move the fork 195 upwardly from the position thereof shown in FIG. 3 to its upper, low speed position in which it engages the stop 197. The upward movement of the fork 202 pushes the spline sleeve 206 upwardly to move the gear 208 out of engagement with the gear 210 and move a worm gear 220 into engagement with a worm 222 on the shaft 132. Then, as the shaft 132 is rotated during the drive of the spool 14, the worm 222 slowly rotates the gear 220 to drive the level wind mechanism slowly.

A lever 230 (FIG. 2) is adapted to turn a leaf spring pawl 232 between an operative position engaging ratchet teeth 234 to permit the spool 14 to be turned only in a reeling-in direction and a retracted position out of the path of the teeth 234 permitting the spool to be turned in either direction. A snap ring 236 in a groove 240 in the shaft 132 and a washer 242 act to hold the shaft 104 against thrust. A lubricating well 244 may be filled with oil by removing the screw 106, and a bore 246 leads from the well to the bore 136 to supply oil to the interior of the housing. While the connecting portion 46 is shown in FIG. 1 as being secured to the upper, righthand portion of the housing 24, the connecting portion may be secured to the extreme righthand portion of the housing with the housing elevated closer to the rod 12, if desired. It is desirable for the connecting portion 46 to be secured to the righthand portion of the housing, as viewed in FIG. 2, near the wall 140 and the spool 14 to substantially balance the reel on the sleeve 44.

The above-described reel is very effectively used for spin casting and with a rotated spool in retrieve. The level wind mechanism is held out of the way for spin casting while being automatically operatively positioned relative to the spool for retrieving the line. The reel also is very effectively used for bait casting in cast as well as retrieve if it is so desired.

It is to be understood that the above-described arrangements are simply illustrative of the application of the principles of the invention. Numerous other ararngements may be readily devised by those skilled in the art which will embody the principles of the invention and fall within the spirit and scope thereof.

What is claimed is:
1. In a fishing reel,
 frame means attachable to a fishing rod,
 a rotatable drive shaft journaled in the frame means and including a ring gear and central bore,
 a second shaft aligned with the drive shaft and journaled in the central bore,
 the second shaft having a worm portion,
 a spool on the second shaft,
 clutch means connecting the spool to the second shaft,
 a worm gear,
 bevel gear means,
 a level wind mechanism, and a cross shaft coupled to the level wind mechanism and carrying the worm gear and the bevel gear means, means mounting the cross shaft for shifting movement thereof relative to the frame means axially between a low speed position of the cross shaft holding the worm gear in a position connected to the worm portion and the bevel gear means in a position disconnected from the ring gear and a high speed position holding the bevel gear means in a position connected to the ring gear and the worm gear in a position disconnected from the worm portion, and manually operable shifting means for selectively shifting the cross shaft between said positions thereof.

2. The fishing reel of claim 1 including:

means mounting the base means movably relative to the rod between a reel position holding the spool extending across the fishing rod and a spin cast position holding the spool extending along the rod, means mounting the level wind mechanism pivotally on the longitudinal axis of the cross shaft, and linkage means holding the level wind mechanism from movement with the spool when the spool is swung to its spin cast position to provide clearance for spin casting.

3. In a fishing reel, reel means including adjustable means, base means carrying the reel means and attachable to a fishing rod, grip means mounted movably on the base means in a position adapted to be grasped and squeezed by a hand of the user simultaneously gripping a handle portion of a fishing rod, coupling means operable by the grip means to actuate the adjustable means, a level wind mechanism, means mounting the level wind mechanism and the spool for relative movement between the spool and the level wind mechanism between reeling positions in which the level wind mechanism is close to and adjacent the spool and spin casting positions in which the level wind mechanism is spaced away from the spool, and means operable by the coupling means for effecting said relative movement.

4. The fishing reel of claim 3 including variable speed drive means connecting the spool and the level wind mechanism, and manually operable means for setting the variable drive means for different speeds of the level wind mechanism.

5. The fishing reel of claim 3 including a drive shaft mounting the spool and adapted to rotate the spool, spline shaft means for driving the level wind mechanism and extending transversely of the drive shaft, the spline shaft means including a low speed gear member thereon and a high speed gear member thereon, high speed gear means coupled to the drive shaft, low speed gear means coupled to the drive shaft, and manually operable means for shifting the spline shaft means to alternately effect driving engagement of the high speed gear member and the high speed gear means and effect driving engagement of the low speed gear member and the low speed gear means.

6. In a fishing reel, takeup means including a rotatable spool and drive means for rotating the spool to wind line thereon, a level wind mechanism for distributing the line on the spool, adjustable coupling means coupling the drive means to the level wind mechanism to drive the level wind mechanism at a predetermined speed relative to the rotation of the spool when in one condition of adjustment and drive the level wind mechanism at a different speed relative to the rotation of the spool when in a second condition of adjustment, selectively operable means for adjusting the coupling means to either of said conditions of adjustment, means mounting the takeup means for movement relative to a fishing rod between a takeup position in which the spool extends transversely of the rod and a spin casting position in which the spool extends along the rod, manually operable means for moving the takeup means selectively between said positions, and means mounting the level wind mechanism and operable by the manually operable means for effecting relative movement of the level wind mechanism and the spool when the position of the takeup means is adjusted to cause the level wind mechanism to be retracted relative to the spool when the spool is in the spin casting position thereof.

7. In a fishing reel, reel means including adjustable means, base means carrying the reel means and including a generally U-shaped portion having feet attachable to the fishing pole, grip means including a handle member mounted movably on the base means in a position adapted to be grasped and squeezed by a hand of the user simultaneously gripping a handle portion of a fishing rod, means mounting the handle member for movement in the U-shaped portion toward and away from the rod, the base means including a tubular member extending from the U-shaped portion and having a slot extending therealong, the reel means including a sleeve rotatable in the tubular member and having a cam slot extending therealong, and coupling means operable by the grip means to actuate the adjustable means and including a key member movable along the slots by the handle member to turn the sleeve in the tubular member.

References Cited

UNITED STATES PATENTS

| 2,604,272 | 7/1952 | Olsen | 242—84.2 |
| 2,633,307 | 3/1953 | Morgan et al. | 242—84.2 |
| 2,776,515 | 1/1957 | Lynch | 242—84.21 XR |
| 3,262,647 | 7/1966 | Harrison | 242—9 |

FOREIGN PATENTS

| 1,030,450 | 3/1953 | France. |

BILLY S. TAYLOR, *Primary Examiner.*

U.S. Cl. X.R.

242—84.42